US005973475A

United States Patent [19]

Combaluzier

[11] Patent Number: 5,973,475

[45] Date of Patent: Oct. 26, 1999

[54] REMOTE SMART BATTERY

[75] Inventor: Pierre Michel Combaluzier, Montréal, Canada

[73] Assignee: IC-TV Interactive Cyber Television Inc., Montreal, Canada

[21] Appl. No.: 09/148,133

[22] Filed: Sep. 4, 1998

[51] Int. Cl.[6] .................. H01M 10/46

[52] U.S. Cl. .................. 320/107; 320/112; 429/98; 429/100

[58] Field of Search .................. 320/107, 110, 320/111, 112, 114, 115; 429/96, 97, 98, 99, 100; D13/103

[56] References Cited

U.S. PATENT DOCUMENTS

| | | | |
|---|---|---|---|
| 4,903,326 | 2/1990 | Zakman et al. | 455/89 |
| 5,001,772 | 3/1991 | Holcomb et al. | 455/90 |
| 5,155,860 | 10/1992 | McClure | 455/89 |
| 5,472,804 | 12/1995 | Austin et al. | 429/99 |
| 5,786,106 | 7/1998 | Armani | 429/98 |
| 5,786,789 | 7/1998 | Janky | 342/357 |

*Primary Examiner*—Edward H. Tso
*Attorney, Agent, or Firm*—Goudreau Gage Dubuc & Martineau Walker

[57] ABSTRACT

A remote smart battery for supplying a cellular telephone comprises a series of electric energy storage cells, a set of supply contacts connected to the storage cells for supplying electric energy from the storage cells to the cellular telephone, a connector having a plurality of female contacts arranged to be respectively connected to the male contacts of an IC card connector already provided on the cellular telephone. The smart battery further comprises a magnetic stripe reading device, an IC card reading device, and a PCMCIA card reading device. Finally, a microcontroller interfaces the cellular telephone with the reading devices. The microcontroller provides the cellular telephone with a supplement of programming to enable use of the cellular telephone for at least one additional function. Use of the cellular telephone for at least one additional function will be authorized in response to information read on a card by the microcontroller through one of the reading devices. As a first example of additional function, a universal remote control device can be connected to the microcontroller to enable the use of the keyboard of the cellular telephone to control operation of the universal remote control device. As another example of additional function, the microcontroller will be capable of transmitting information toward a remote central processor through the cellular telephone.

20 Claims, 5 Drawing Sheets

REMOTE SMART BATTERY

BACKGROUND OF THE INVENTION

1. Field of the Invention

The present invention relates to new concept of smart battery for supplying a cellular telephone and for enabling the use of the cellular telephone for at least one additional function.

2. Brief Description of the Prior Art

Cellular telephony is a widely used technology. The most expensive element of the portable cellular telephones presently available on the market is by all means the rechargeable battery. And many battery modules may be required by a single user to ensure a full day of operation of his (her) cellular telephone.

OBJECT OF THE INVENTION

A general object of the present invention is to make the purchase of a battery more profitable by integrating to the battery components that enable use of the cellular telephone for at least one additional function.

SUMMARY OF THE INVENTION

More specifically, in accordance with the present invention, there is provided a remote smart battery for supplying a cellular telephone, comprising an electric energy storage section, a set of supply contacts connected to the storage section for supplying electric energy from the storage section to the cellular telephone, a first connector having a plurality of contacts arranged to be respectively connected to a plurality of contacts of a second connector of the cellular telephone, a card reading device, and an interface circuit for interconnecting the card reading device and the contacts of the first connector.

The present invention also relates to the cellular telephone/smart battery combination.

In accordance with preferred embodiments:

- the electric energy storage section comprises a series of electric energy storage cells;
- the contacts of the first connector are female contacts and the contacts of the second connector are male contacts, the female contacts being concave and the male contacts being convex to mate to the concave contacts;
- the interface circuit comprises a microcontroller for providing the cellular telephone with a supplement of programming to thereby enable use of the cellular telephone for at least one additional function;
- the remote smart battery further comprises a universal remote control device connected to the microcontroller, wherein the microcontroller forms an interface between the universal remote control device and the cellular telephone to enable the use of a keyboard of the cellular telephone to control operation of the remote control device;
- the supplement of programming provided by the microcontroller to the cellular telephone authorizes use of the cellular telephone for at least one additional function in response to information read on a card through the card reading device; and
- the supplement of programming provided by the microcontroller to the cellular telephone enables the microcontroller to transmit information toward a remote central processor through the cellular telephone;

According to a further preferred embodiment of the present invention, the remote smart battery further comprises a housing defining a planar wall face, a transparent tactile keyboard membrane and an IC card connector. The transparent tactile keyboard membrance is connected to the microcontroller and is mounted in front of but spaced apart from the planar wall face to define a slot between the planar wall face and the transparent tactile keyboard membrane for receiving an IC card covered by an envelope on which a keyboard layout is printed. This keyboard layout appears through the transparent tactile keyboard membrane when the IC card is inserted in the slot. The IC card connector, forming part of the card reading device, is mounted on the planar wall face and has a plurality of contacts for connection to surface-mounted contacts of the IC card through a window of the envelope.

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENT

Figure 1:
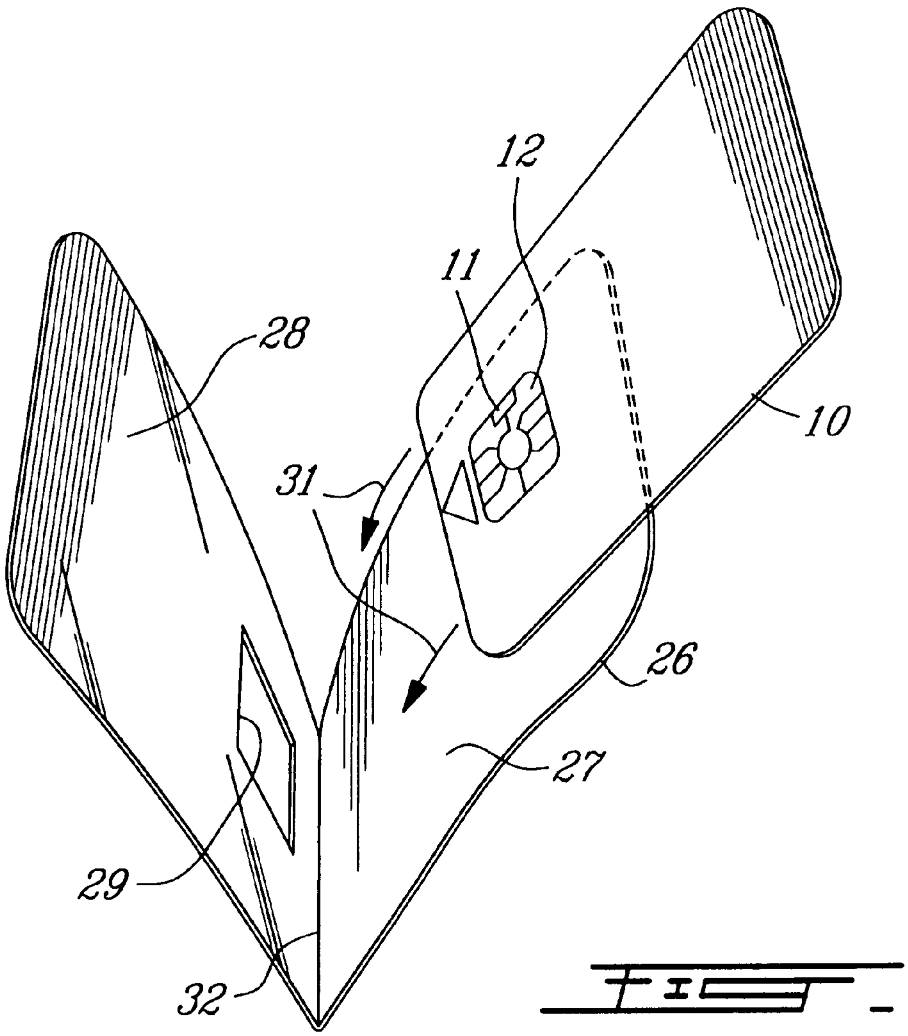
FIG. 1 is a perspective view of a leaflet (envelope) for receiving an IC card and form an IC card/leaflet combination, showing a window in one of the flexible flaps of the leaflet for accessing the surface-mounted contacts of the IC card.

In the different figures of the appended drawings, the same elements are identified by the same reference numerals.

Figure 4:
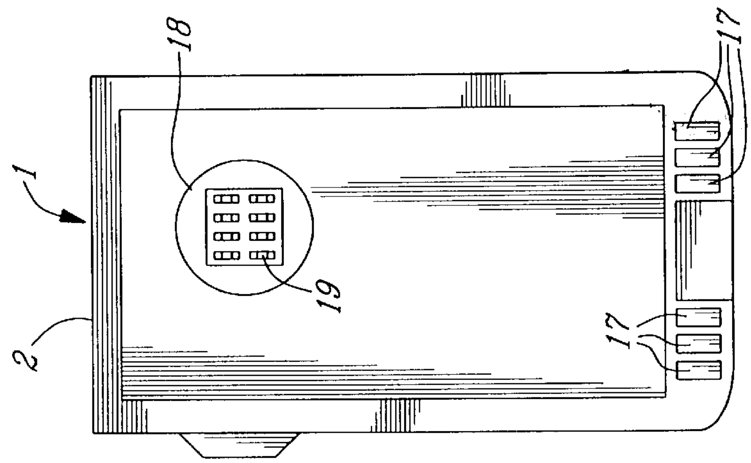
FIG. 4 is a rear elevational view of the remote smart battery of FIGS. 2 and 3.
Figure 3:
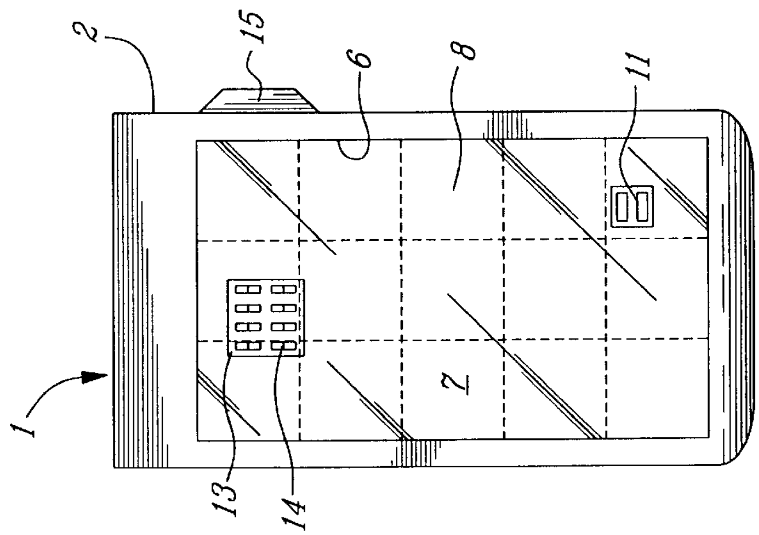
FIG. 3 is a front elevational view of the remote smart battery of FIG. 2.
Figure 2:
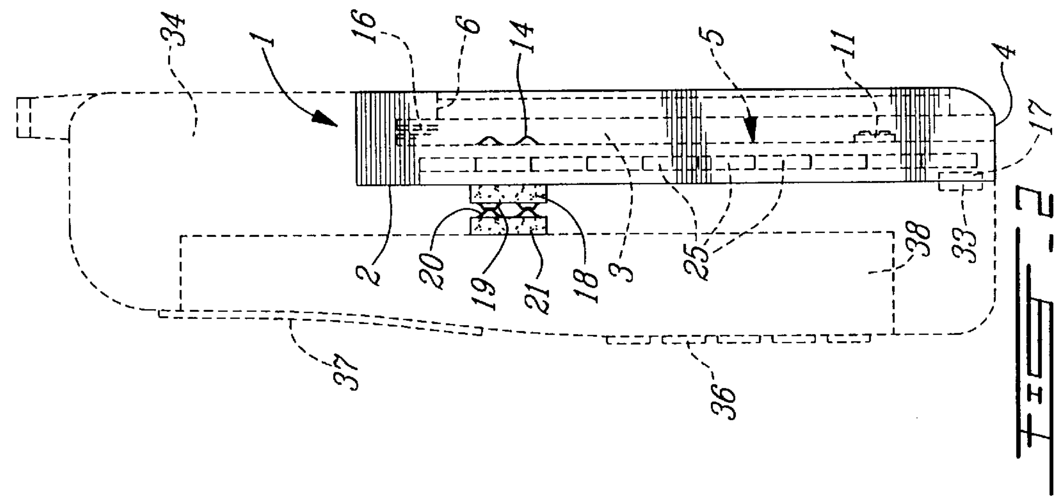
FIG. 2 is a side elevational view of the remote smart battery in accordance with the present invention, installed on a partially shown cellular telephone.

Referring to FIGS. 2–4, the preferred embodiment of the remote smart battery 1 comprises a plastic housing 2. The plastic housing 2 contains a series of rechargeable storage cells such as 25, of the type Cd Ni/Ni Mn (Cadmium Nickel/Nickel Manganese) for supplying a cellular telephone, optionally through a voltage selector (not shown) and a voltage filter (not shown).

The housing 2 of the remote smart battery 1 further defines a slot 3 having an opening 4 situated at the lower end face of the housing 2, to receive a magnetic stripe card, an IC card or a PCMCIA card. The card is inserted through the opening 4 and, then, slid into the slot 3.

The slot 3 is delimited on one side by a flat wall 5 of the plastic housing 2. On the side of the slot 3 opposite to the flat wall 5, the plastic housing 2 defines a window 6. A transparent plastic membrane 7 is mounted over the window 6 to enable visual inspection of the inserted card and the position of this card in the slot 3. According to an alternative, the transparent membrane 7 is a transparent tactile keyboard membrane. In the illustrated non limitative example, the transparent tactile keyboard membrane 7 comprises 15 resistive tactile zones such as 8 shown by means of dashed lines.

Still referring to FIGS. 2–4, an universal IC card connector 13 including a standard set of eight protruding contacts such as 14 is mounted on the flat wall 5 to respectively connect to a set 11 of eight surface-mounted contacts such as 12 of an IC card 10 (FIG. 1) every time the IC card 10 is inserted in the slot 3 through the opening 4.

Also, a magnetic stripe reading head 11 is installed on the flat wall 5 of the plastic housing 2 to read the magnetic stripe of a magnetic stripe card.

Moreover, a strip 24 of PCMCIA pins 16 is mounted at the top end of the slot 3 to receive a PCMCIA card.

A pawl 15 triggers a mechanism (not shown) for ejecting the magnetic stripe card, the IC card or the PCMCIA card form the slot 3 through the opening 4. This type of mechanism is well known to those of ordinary skill in the art and, accordingly, will not be further described in the present specification.

On the rear face of the plastic housing 2, a set of six surface-mounted supply contacts 17 are connected to the electric energy storage cells 25. As shown in FIG. 2, the supply contacts 17 connect to a set of six supply contacts such as 33 of the cellular telephone 34. When the contacts 17 and 33 are connected to each other, the cellular telephone 34 is supplied with electric energy from the storage cells 25.

Figure 5:
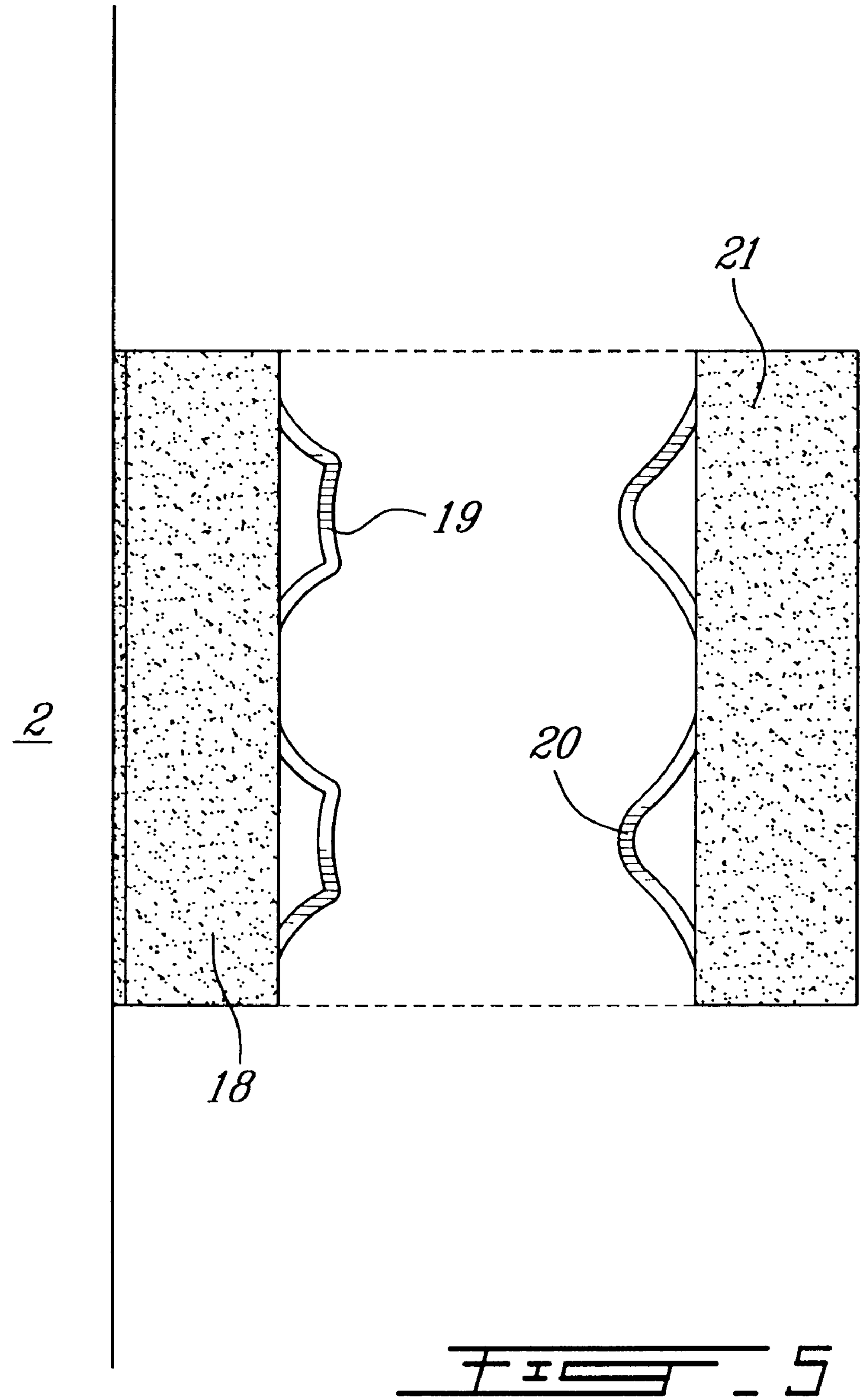
FIG. 5 is a side elevational view of an IC card connector of the cellular telephone and a connector of the remote smart battery having female contacts which connect to the male contacts of the IC card connector.

As shown in FIGS. 4 and 5, a connector 18 comprising eight contacts such as 19 are mounted on the rear face of the plastic housing 2. Referring to FIG. 5, the eight contacts 19 of the connector 18 respectively connect to eight contacts 20 of a connector 21 already provided on the cellular telephone 34 to connect to the surface-mounted contacts of an IC card. As can be appreciated by those of ordinary skill in the art, the eight contacts 20 of the connector 21 are already connected to, more specifically in communication with the electronic circuit 38 of the cellular telephone 34. To ensure good electrical contact and consequently adequate electric conductivity, the contacts 19 are concave to mate to the exact shape of the convex contacts 20.

An electronic circuit is incorporated in the remote smart battery 1. This electronic circuit comprises a microprocessor-based microcontroller 22 supplied with electric energy from the storage cells 25 of the remote smart battery 1. The microcontroller 22 is connected to:

- the magnetic stripe reading head 11;
- the eight contacts 14 of the connector 13;
- the eight contacts 19 of the connector 18;
- the strip 24 of PCMCIA pins 16;
- the transparent tactile keyboard membrane 7;
- a universal remote control device 25 incorporating all the function protocols of the TV, VCR, and Audio commands of most of the brands available on the market (95%); and
- a RDS (Radio FM (Frequency Modulation) Data System) 35.

Just a word to mention that the magnetic stripe reading head 11, the connector 13 and the strip 24 of PCMCIA pins 16 make the remote smart battery 1 standard, that is usable whatever the technology of the card inserted in the opening 4 of the slot 3.

Although this is not specifically shown in the drawings, the housing 2 of the remote smart battery 1 is structured to fit on the cellular telephone 34 to either form the original rechargeable battery module of the cellular telephone or to replace the original battery module of this cellular telephone 34. Installation of the remote smart battery 1 on the cellular telephone 34 will cause:

- electric supply of the cellular telephone 34 by electric energy storage cells 25 of the remote smart battery 1 through the above described contacts 17 and 33; and
- connection of the microcontroller 22 of the remote smart battery 1 to the cellular telephone 34 through the connectors 18 and 21.

The microcontroller 22 is programmed to bring to the cellular telephone 34 a supplement of programming to enable this cellular telephone 34 to perform or fulfill at least one additional function. Connection of the microcontroller 22 to the cellular telephone 34 will therefore bring to the cellular telephone 34 this supplement of programming. The keyboard 36 of the cellular telephone 34 can then be employed by a person to use the additional function(s).

When a card with a magnetic stripe is inserted in the slot 3 through the opening 4, the information recorded on the magnetic stripe is read by the microcontroller 22 through the magnetic stripe reading head 11.

When an IC card is inserted in the slot 3 through the opening 4, the information memorized in this IC card can be read by the microcontroller 22 through the contacts 14 of the connector 13 and the surface-mounted contacts 12 of the IC card 10.

In the case of a PCMCIA card, the infomation stored in the PCMCIA card can be read by the microcontroller 22 through the strip 24 of PCMCIA pins 16.

The information read by the microcontroller 22 on the magnetic stripe card, the IC card or the PCMCIA card will allow this microcontroller 22 to:

- identify the user in view of authorizing the use of the cellular telephone 34 for the additional function(s);
- when a pre-payment is required to use the cellular telephone 34 for the additional function(s), to debit this pre-payment either directly on the card, on the bank account associated to the card, the credit card account associated to the card, etc.;
- when a cellular communication is required to use the cellular telephone 34 for the additional function(s), to debit the cost of this cellular communication either directly on the card, on the bank account associated to the card, the credit card account associated to the card, etc.;
- when the additional function is a game, to credit gains of the user either directly on the card, on the bank account associated to the card, the credit card account associated to the card, etc.;
- etc.

Although two non limitative examples of use of the remote smart battery according to the present invention will be described hereinafter, it should be kept in mind that many other applications are possible. The number and nature of the applications of the remote smart battery 1 is only limited by imagination.

EXAMPLE NO. 1

Information can be received through the RDS 35. This information is then transferred by the microcontroller 22 to the cellular telephone 34 for audio playback or display on the cellular telephone display 37. The user can then answer through a cellular telephone connection either orally or through depression of the keys of the cellular telephone.

It can also be imagined to play a FM broadcasted interactive game. The radio program can be broadcasted by means of a RDS carrier or not. The RDS 35 or other FM receiver then receives the radio program which is reproduced for example through the earphone or speaker of the cellular telephone 34. The user can then play the radio game through depression of the keys of the cellular telephone keyboard 36.

EXAMPLE NO. 2

Figure 6A:
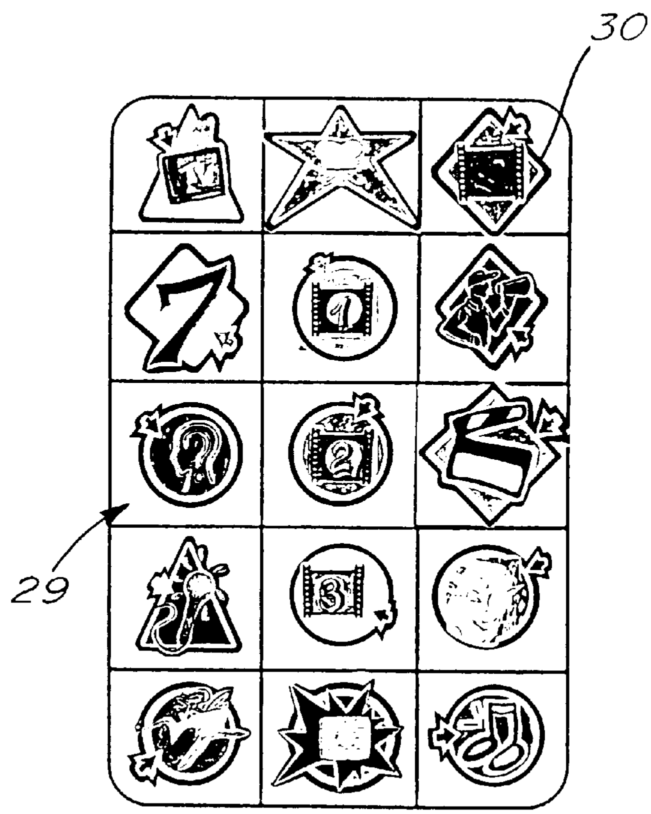
FIG. 6*a* is an example of keyboard layout that can be printed on the outer face of the rear flap of the leaflet of FIG. 1.
Figure 6B:
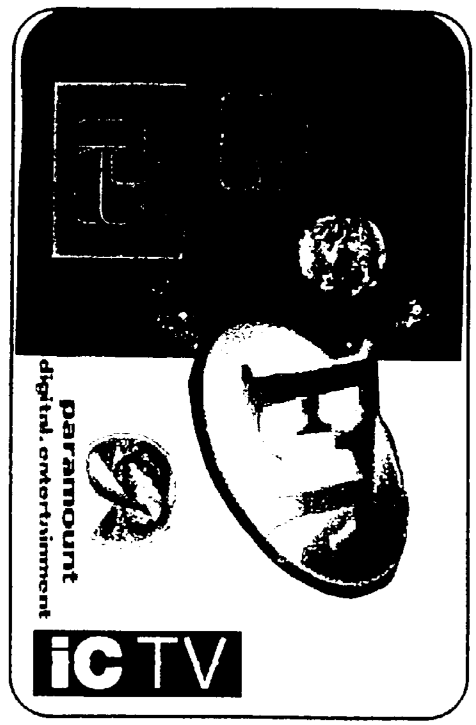
FIG. 6*b* is an example of illustration that can be printed on the outer face of the front flap of the leaflet of FIG. 1.
Figure 7:
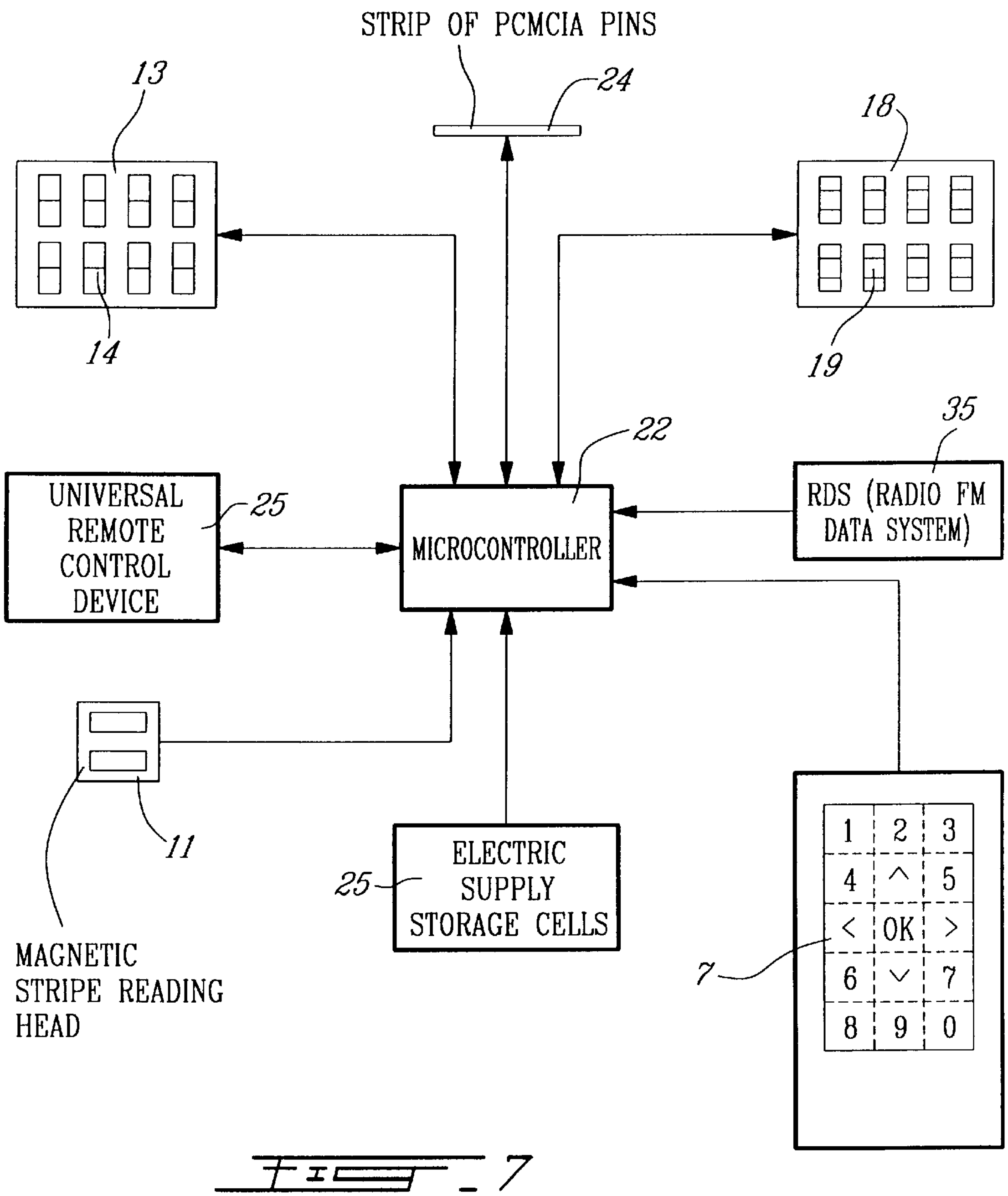
FIG. 7 is a block diagram of the electronic circuit of the remote smart battery according to the present invention.

To play a game related to a given TV program, for example the popular program ENTERTAINMENT TONIGHT™, a leaflet 26 (FIG. 1) comprising rear 27 and front 28 flaps is used. FIG. 6*a* illustrates an example of keyboard layout 29 which can be printed on the outer face of the rear flap 27, and FIG. 6*b* illustrates the outer face of the front flap 28 on which can be printed, for example, identification of the issuing organization, advertising of the TV program, identification of the producers, etc.

Just a word to mention that the leaflet 26 is made of plastic material to be produced at low cost (some cents by unit) and can be distributed to the public at large:

on wine bottles;

on soft drink packs;

inside weekly TV guides;

by direct mail;

in fragrance boxes;

in magazines;

on cigarette boxes;

in photo film boxes;

in airflight tickets;

in show tickets envelopes;

in gift menus;

in check flyers;

etc.

Since the leaflet 26 is susceptible to increase their sales and profits, the companies involved are likely to incorporate the leaflet 26 to their products at no extra charge.

The first step consists of inserting the IC card 10 in the leaflet 26 so as to expose the surface-mounted contacts 12 through the window 29. The IC card 10/leaflet 26 combination is then inserted in the slot 3 through the slot opening 4. The keyboard layout 29 of FIG. 6*a* then appears through the transparent tactile keyboard membrane 18. As can be appreciated, each icon 30 of the keyboard layout 29 of FIG. 6*a* appears through a respective resistive area 8 of the transparent tactile keyboard membrane 7.

The smart battery/cellular telephone combination then forms a TV remote control thanks to the universal remote control device 25 including the necessary infrared emission diode or other emission device. The user depresses the keys of the cellular telephone 34 to tune the TV set to the channel on which the TV program associated to the leaflet 26 is broadcasted. Then, the user can answer the questions broadcasted during the TV program. An icon 30 of the keyboard layout 29 is associated to each question. The questions are advantageously multiple-choice questions in which the user has to choose the correct answer from a number of three alternatives, i.e. alternatives (1), (2) and (3).

If the user chooses alternative (1) as an answer to a question, he (she) presses once on the zone 8 of the transparent tactile keyboard membrane 7 behind which the icon 30 corresponding to the question appears. If alternative (2) is chosen, the user presses twice on the zone 8 of the transparent tactile keyboard membrane 7 behind which the corresponding icon 30 appears. If the user chooses alternative (3) as an answer to the question, he (she) presses three times on the zone 8 of the transparent tactile keyboard membrane 7 corresponding to the icon 30 associated to the question.

The user will answer to a series of questions during at least one TV programs using one or more leaflets such as leaflet 26.

The microcontroller 22 is responsive to depression of the tactile zones 8 of the transparent keyboard membrane 7 to record the answers of the user in either a microprocessor and memory circuit of the IC card 10, the microcontroller 22 itself or a memory of the cellular telephone 34. The time at which these answers are given is also recorded.

In this way, the user accumulates rights in relation to his (her) answers. He (She) also defines, in time, his (her) consumer profile. To obtain these rights, the user actuates the keyboard 36 of the cellular telephone 34 to establish a cellular telephone connection between the telephone 34 and a remote central processor (not shown). The cellular telephone connection can also be established automatically through the program of the microcontroller 22. The identification of the user as obtained from the card inserted in the slot 3, and the rights accumulated are transmitted to and processed by the remote central processor to convert these rights to money or credit. That money or credit can be credited directly in the microprocessor and memory circuit of the IC card directly through the cellular phone. It can also be credited to a bank or credit card account associated to the IC card.

The information can be transferred to the remote central processor at the end of the TV program. Alternatively, the information can be transferred at the end of each sequence of a series of successive sequences of predetermined duration, for example five minutes.

Since the identification of the card inserted in the slot 3 is transmitted along with the information, the remote central processor is capable of conducting a survey of the population for rating (percent of TV households that are tuned, on the average, to one time period in a particular program).

Finally, it should be mentioned that the above mentioned gain can be paid by any interested party, for example public survey organizations.

Although the present invention has been described hereinabove by way of a preferred embodiment thereof, this embodiment can be modified at will, within the scope of the appended claims, without departing from the spirit and nature of the subject invention.

What is claimed is:

1. A remote smart battery for supplying a cellular telephone, comprising:

an electric energy storage section;

a set of supply contacts connected to the storage section for supplying electric energy from the storage section to the cellular telephone;

a first connector having a plurality of contacts arranged to be respectively connected to a plurality of contacts of a second connector of the cellular telephone;

a card reading device; and an interface circuit for interconnecting the card reading device and the contacts of the first connector.

2. A remote smart battery as defined in claim 1, wherein the electric energy storage section comprises a series of electric energy storage cells.

3. A remote smart battery as defined in claim 1, wherein the contacts of the first connector are female contacts and the contacts of the second connector are male contacts.

4. A remote smart battery as defined in claim 3, wherein the female contacts are concave and the male contacts are convex to mate to the concave contacts.

5. A remote smart battery as defined in claim 1, wherein the interface circuit comprises a microcontroller for providing the cellular telephone with a supplement of programming to thereby enable use of the cellular telephone for at least one additional function.

6. A remote smart battery as defined in claim 5, further comprising a universal remote control device connected to the microcontroller, said microcontroller forming an interface between the universal remote control device and the cellular telephone to enable the use of a keyboard of the cellular telephone to control operation of the remote control device.

7. A remote smart battery as defined in claim 1, further comprising:

a housing defining a planar wall face;

a transparent tactile keyboard membrane connected to the microcontroller and mounted in front of but spaced apart from the planar wall face to define a slot between the planar wall face and the transparent tactile keyboard membrane for receiving an IC card covered by an envelope on which a keyboard layout is printed, said keyboard layout appearing through the transparent tactile keyboard membrane when the IC card is inserted in the slot; and an IC card connector mounted on the planar wall face and having a plurality of contacts for connection to surface-mounted contacts of the IC card through a window of the envelope, the IC card connector forming part of the card reading device.

8. A remote smart battery as defined in claim 5, wherein the interface circuit comprises a microcontroller for providing the cellular telephone with a supplement of programming authorizing use of the cellular telephone for at least one additional function in response to information read on a card through the card reading device.

9. A remote smart battery as defined in claim 5, wherein the interface circuit comprises a microcontroller for providing the cellular telephone with a supplement of programming enabling the microcontroller to transmit information toward a remote central processor through the cellular telephone.

10. A cellular telephone/smart battery combination comprising:

a cellular telephone including an electronic circuit and a housing;

a first set of supply contacts mounted on the cellular telephone for supplying said cellular telephone with electric energy;

a first connector including a plurality of contacts in communication with the cellular telephone;

a smart battery including:

an electric energy storage section;

a second set of supply contacts connected to both the storage section and the supply contacts of the first set for supplying electric energy from the storage section to the cellular telephone;

a second connector having a plurality of contacts respectively connected to the contacts of the first connector;

a card reading device; and an interface circuit for interconnecting the card reading device and the contacts of the second connector.

11. A cellular telephone/smart battery combination as defined in claim 10, wherein the electric energy storage section comprises a series of electric energy storage cells.

12. A cellular telephone/smart battery combination as defined in claim 10, wherein the contacts of the second connector are female contacts and the contacts of the first connector are male contacts.

13. A cellular telephone/smart battery combination as defined in claim 12, wherein the female contacts are concave and the male contacts are convex to mate to the concave contacts.

14. A remote smart battery as defined in claim 10, wherein the interface circuit comprises a microcontroller for providing the cellular telephone with a supplement of programming to thereby enable use of the cellular telephone for at least one additional function.

15. A cellular telephone/smart battery combination as defined in claim 14, wherein the cellular telephone comprises a keyboard, and wherein the cellular telephone/smart battery combination further comprises a universal remote control device connected to the microcontroller, said microcontroller forming an interface between the universal remote control device and the cellular telephone to enable the use of the keyboard of the cellular telephone to control operation of the remote control device.

16. A cellular telephone/smart battery combination as defined in claim 10, further comprising:

a housing defining a planar wall face;

a transparent tactile keyboard membrane connected to the microcontroller and mounted in front of but spaced apart from the planar wall face to define a slot between the planar wall face and the transparent tactile keyboard membrane for receiving an IC card covered by an envelope on which a keyboard layout is printed, said keyboard layout appearing through the transparent tactile keyboard membrane when the IC card is inserted in the slot; and an IC card connector mounted on the planar wall face and having a plurality of contacts for connection to surface-mounted contacts of the IC card through a window of the envelope, the IC card connector forming part of the card reading device.

17. A cellular telephone/smart battery combination as defined in claim 10, wherein the interface circuit comprises a microcontroller for providing the cellular telephone with a supplement of programming authorizing use of the cellular telephone for at least one additional function in response to information read on a card through the card reading device.

18. A cellular telephone/smart battery combination as defined in claim 10, wherein the interface circuit comprises a microcontroller for providing the cellular telephone with a supplement of programming enabling the microcontroller to transmit information toward a remote central processor through the cellular telephone.

19. A cellular telephone/smart battery combination as recited in claim 10, wherein the card reading device is selected from the group consisting of a magnetic stripe reading device, an IC card reading device, and a PCUCIA card reading device.

20. A cellular telephone/smart battery combination as recited in claim 10, wherein the card reading device comprises a magnetic stripe reading device, an IC card reading device, and a PCMCIA card reading device.

* * * * *